April 21, 1953  H. M. McCARTHY  2,635,627
AUXILIARY OPERATED PRESSURE RELIEF VALVE
Filed June 3, 1948  3 Sheets-Sheet 1

Harold M. McCarthy Inventor
By W. V. T Heilman Attorney

April 21, 1953        H. M. McCARTHY        2,635,627

AUXILIARY OPERATED PRESSURE RELIEF VALVE

Filed June 3, 1948        3 Sheets-Sheet 2

Harold M. McCarthy Inventor
By W. O. J. Heilman Attorney

Harold M. McCarthy Inventor
By W. O. T. Hilman Attorney

Patented Apr. 21, 1953

2,635,627

UNITED STATES PATENT OFFICE 2,635,627

AUXILIARY OPERATED PRESSURE RELIEF VALVE

Harold M. McCarthy, Rahway, N. J., assignor to Standard Oil Development Company, a corporation of Delaware Application June 3, 1948, Serial No. 30,916

5 Claims. (Cl. 137—492)

The present invention relates to a pressure responsive device such as quick-acting, spring-loaded, pressure relief valve, and more particularly to a valve of such character equipped with auxiliary means to automatically open the valve to its fullest venting capacity upon slight movement of the valve under impulse of the pressure to be released. It is a particular object of the invention to provide an auxiliary means of such character which will not otherwise interfere, to any appreciable extent, with normal functioning of the valve mechanism. It is also an object of the invention to provide such means in which operation and resetting of the means is entirely automatic, through self-contained operating mechanisms. A further object of the invention is to provide a pressure relief valve operable to vent a large volume at comparatively low pressure.

Pressure relief valves as previously designed have been adapted for service involving the relief of vessels of comparatively small capacity at high pressures, or where the pressure accumulation is at a comparatively low rate. With the advent of large capacity process operations where pressures even slightly above atmospheric are sometimes dangerous, and where the pressure may develop rapidly unless immediately and fully vented at once, the common types of pressure relief means have not proved capable of safe operation. For example, where the commonly available pressure relief devices may have a maximum orifice area of from 10 to 15 square inches, several must be employed to obtain the orifice areas of above 100 square inches are required by present service, and with each device so added an additional hazard of individual failure is incurred, as well as the imposition of additional installation and maintenance expense.

Pilot operated valves functioning under the impulse of some means other than the pressure to be relieved have been proposed before, but for the most part have been unsuccessful, or not adaptable to the service now contemplated. In the service contemplated, a relief device is required which will provide a large orifice area, capable of venting pressures from atmospheric to about 50 pounds per square inch, and which will present its full orifice area to vent the pressure before such pressure may rise more than 10 percent above that for which the device is set. Further, such a device must be operable, at least in ordinary fashion, in spite of failure of the pilot or booster operating mechanisms.

The present invention contemplates a pilot operated valve structure, actuated by a fluid medium, which meets these requirements, and in which a reserve supply of the fluid medium is provided against failure of the normal supply thereof.

The invention and its object may be more fully understood from the following description of an embodiment thereof, when read in conjunction with the accompanying drawings, in which.

Figure 1:
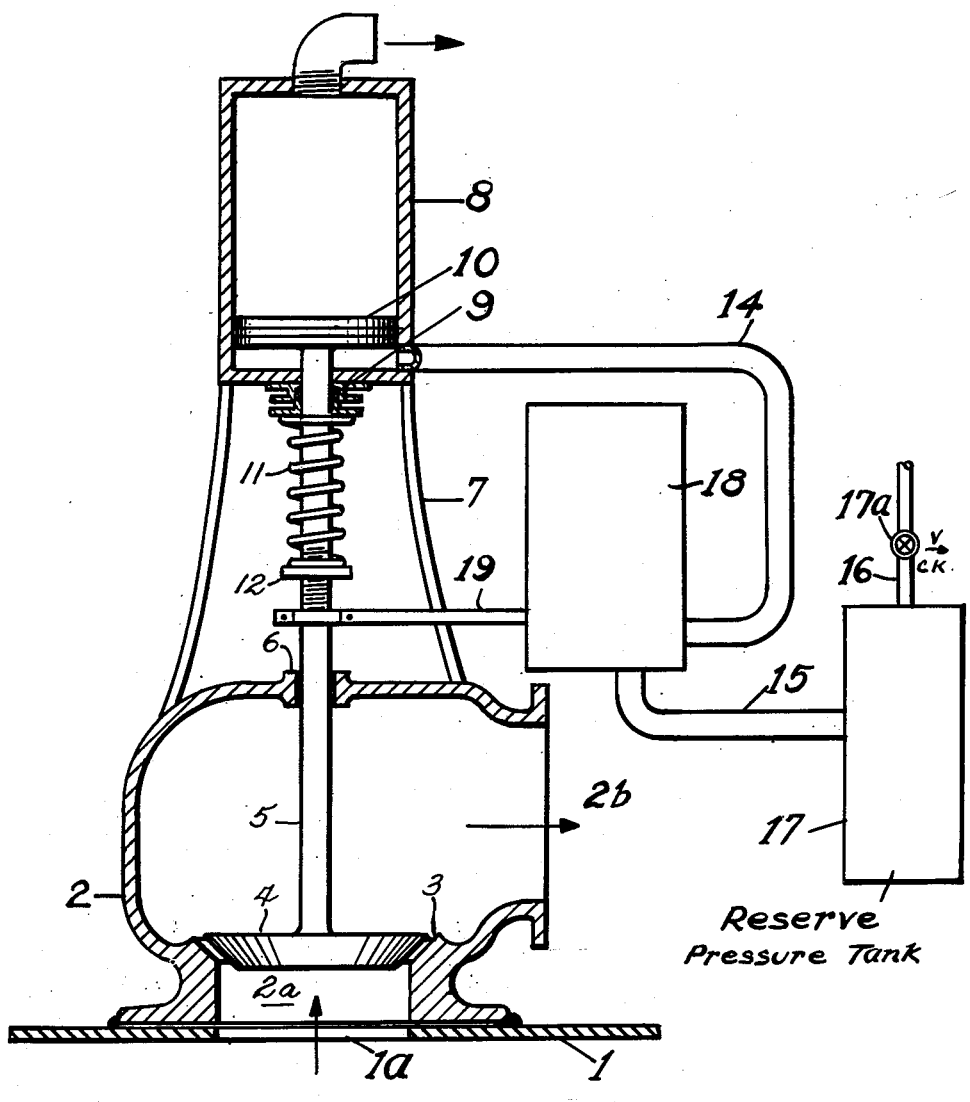
Fig. 1 is a side elevation partly in vertical section of a typical valve structure according to the invention.

Referring more particularly to the drawings, the numeral 1 designates the shell of a pressure vessel having a vent opening 1a. A valve or pressure relief housing 2 is disposed over the opening, concentric therewith. The housing 2 is provided with an inlet 2a and is vented to the atmosphere through a flanged discharge passage or outlet 2b, which may be connected to a conduit to conduct the material vented from the vessel to a more remote point of discharge.

Within the housing 2, a valve seat 3 is provided in the inlet 2a to receive a valve head 4. A valve stem 5 secured to the head 4 at one end extends outwardly through a loosely fitted gland 6 in the housing 2, extending therebeyond, within the superstructure 7 into a cylinder 8 by way of a stuffing box 9. The outer end of the valve stem is connected to a piston head 10 within the cylinder 8. A spring member 11, concentric with the valve stem 5, at its upper end bears against the lower portion of the cylinder and at its lower end against an annular collar 12 threaded on the valve stem 5. The position of the collar 12 may be adjusted longitudinally of the valve stem to vary compression of the spring 11, and thereby determine the pressure required in the vessel to unseat valve 5.

Figure 1A:
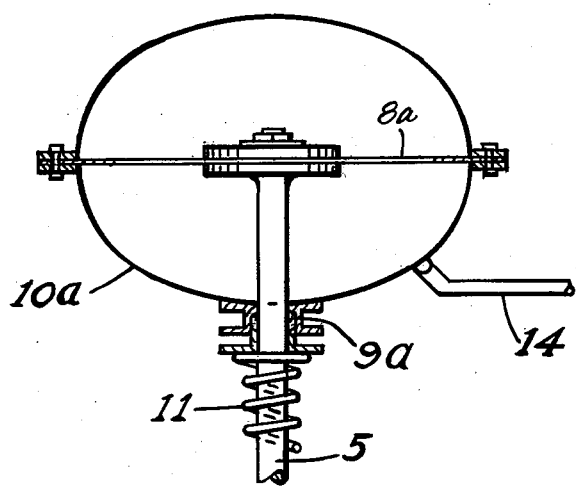
Fig. 1A is a similar view of a portion of an alternate form.

If desired, the piston 10 and cylinder 8 may be replaced by a diaphragm type valve operating means. Such means is conventional in form and is generally illustrated by Fig. 1A. The cylinder 8 is replaced by a two-part chamber 10a having a flexible lateral diaphragm member 8a movable under pressure supplied through conduit 14, the outer end of the valve stem 5 being secured to the diaphragm in any suitable fashion. Also, it is within the contemplation of the invention to move the stem 5 as by a solenoid mounted concentrically therewith.

The cylinder 8 is connected to a source of fluid pressure, not shown, to actuate the piston 10 and raise valve head 4 from the seat 3, by means of conduits 14, 15 and 16. The conduit 16 opens into a reserve pressure tank 17, with a check valve 17a in the line to prevent back-flow and retain pressure on the tank 17 in the event of failure of the fluid pressure source. Conduit 15 is connected to the tank 17 and to the conduit 14 through valve means within a protective case 18, as particularly shown in Fig. 2. An operating arm or lever 19 rigidly secured or clamped to the valve stem 5 extends therefrom into the case 18 as shown and described with reference to Fig. 2.

Figure 2:
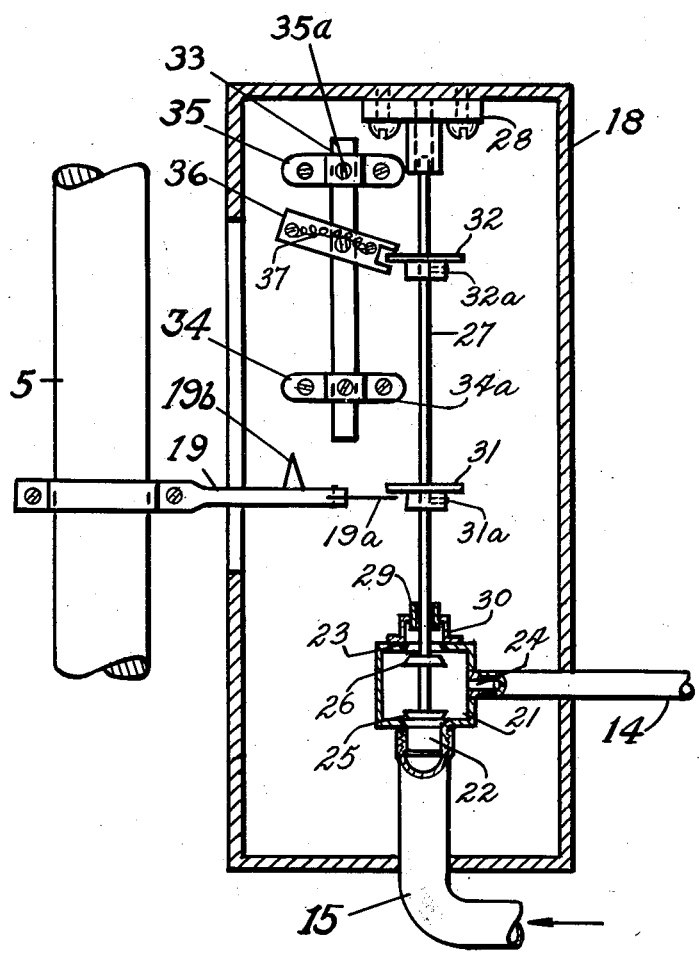
Fig. 2 is an enlarged vertical section through an auxiliary actuating device.

In the actuating device, or control means for energizing or deenergizing the operating means previously described, illustrated by Fig. 2, the protective case 18 contains a valve chamber 21 having an inlet port 22 connected to the conduit 15, and an exhaust port 23 opening into the case. The chamber 21 is in two-way communication with the cylinder 8 at all times through the port 24 and conduit 14. The inlet and exhaust ports 22 and 23 are arranged to function alternately by means of valves 25 and 26 respectively, so disposed on the operating rod or valve stem 27 that when one is opened the other will be closed. If desired, a three-way valve may be suitably connected to the conduits 14 and 15, and by proper linkage to the rod 27 caused to function in similar fashion to the same end. The operating rod 27 extends upwardly through the case 18 and is supported at its upper end for reciprocal movement in a flanged sleeve member or guide 28. The lower portion of the rod is supported by means of a bushing 29 carried as by a spider 30, concentric with the exhaust port 23.

The rod 27 carries a pair of spaced flanged collar members 31 and 32 adjustable on the rod by means of set screws 31a and 32a respectively. A spring steel finger or cam lever 19a is affixed to the inner end of the arm 19, and the arm, in conjunction with the collar 31, is adjusted so that, with the valve head 4 seated, the finger 19a engages the lower surface of the flange on collar 31. A support shaft 33 is adjustably mounted on an inner sidewall of the case 18, above the arm 19 and parallel with the rod 27, being held in a fixed predetermined position by means of clamps 34 and 35 and set screws 34a and 35a. A snap action lever 36 is pivotally mounted on the shaft 33 extending toward and engaging the flange portion of collar 32, the lever snap-action being obtained by means of a spring 37. Actuation of the lever 36 by means of spring 37 is comparable to that conventional in toggle type electric wall switches. A contact element 19b is provided on the arm 19 to engage and lift the lever 36 during upward movement of the valve stem 5.

Figures 3, 4:
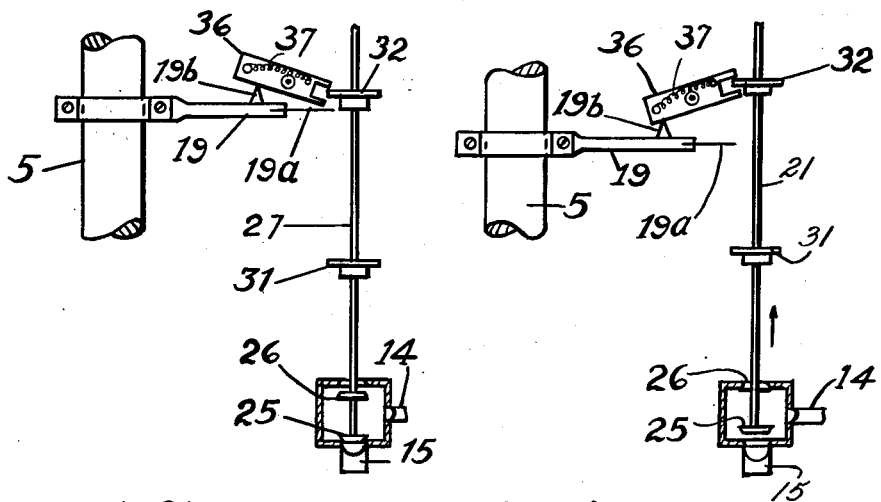
Figs. 3 and 4 are diagrammatic illustrations of stages in the operation of the device.

In operation, the compression of valve loading spring 11 is adjusted by means of the collar 12 so as to provide the resistance required to maintain the valve head 4 seated against the pressure desired to be maintained in the vessel 1. With the valve thus seated, and the inlet port 22 closed by valve 25, the arm 19 is positioned on valve stem 5, and collars 31 and 32 are positioned on valve rod 27 so that slight upward movement of the valve head 4 will immediately raise the collar 31 through the arm 19 and leaf spring 19a, thereby raising rod 27, valve 25 and collar 32, opening valve port 22. The raising of collar 32 on rod 27 lifts lever 36 which is adjusted by means of shaft 33 so that only slight upward, or downward movement is required to permit the spring 37 to induce snap-action of the lever 36. By such action, the collar 32 is lifted suddenly, and thereby the rod 27, to the limit required to fully open port 22, and close port 23 by means of valve 26. The relative position of the elements after actuation of the lever 36 is shown diagrammatically in Fig. 3.

With port 22 open, and port 23 closed fluid is permitted to flow through lines 15 and 14 under the pressure of the tank 17 as supplied through the line 16. This flow of fluid through line 14 into cylinder 8, raises the piston 10 and thereby positively actuates the valve stem 5 to open the valve 4, rapidly and to its full extent against the resistance of the spring 11. Once the valve has been so opened the velocity flow of the material vented through the opening 1a and housing 2b will be sufficient to maintain the valve in an open position until the pressure in vessel 1 has been safely reduced.

Of course, upon upward movement of the valve stem 5 under the fluid pressure applied to the piston 10, the arm 19 rises and the contact element 19b is brought into engagement with the lower surface of the lever 36, forcing it upward, and reversing the snap-action effect of spring 37 on lever 36. The lever 36 thus is turned on its pivot point to force collar 32 downward, and with it the rod 27 and valves 25 and 26. This action abruptly closes the port 22, and opens the port 23. The relative position of the several elements at this point is shown diagrammatically in Fig. 4. The opening of port 23 thus releases pressure against the piston 10, and as soon as the venting of the vessel 1 is accomplished, the pressure of the spring 11 is unopposed in its action to return the valve 4 to its seat 3. Upon upward or downward movement of the arm 19 beyond the level of collar 31 when fully raised or lowered by the snap-action of lever 36, the leaf spring 19a is deflected or bent by the flanged portion of collar 31 to permit passage thereby.

Where the operating means is a solenoid, the control means contained in the case 18 may be a simple electric switch actuated in the same or a manner comparable to that described in connection with the fluid control means illustrated. Where used under circumstances requiring operation in spite of failure of the normal source of electric power, provision may be made for automatic connection with an auxiliary operated power source or with storage batteries.

The invention has been described with particular reference to a specific embodiment thereof. Various changes and embodiments are possible, however, and it is not intended to be limited by these disclosures, for the purpose of illustration, but only by the following claims.

I claim:

1. A pressure responsive device comprising a valve member initially movable from a valve seat under pressure applied to said valve member, a valve stem joined at one end to said valve member, a valve lifting mechanism at the other end of said stem to accelerate movement of the valve member from its seat, an independent power source to energize said mechanism, a power transmission system connected between said source and the valve lifting mechanism, a control means in said system normally closing the system against transmission of power to energize said mechanism from the source, a lever element in said system and a support therefor, said element pivotally mounted on said support for reciprocally arcuate movement relative thereto, said element engaging said control means at one end, spring means secured to said element and acting thereon to accelerate movement of the lever element and thereby said control means, a control actuating means carried by said valve stem sequentially to engage said control means and lever element upon initial and immediately subsequent unseating movement of the valve and stem under pressure applied to said valve, actuating said control means, lever, and spring means to open said transmission system and to re-close it in sequence, energizing and immediately de-energizing said valve lifting mechanism, and means for reseating said valve upon release of pressure originally applied thereto.

2. A pressure relief device comprising a vent housing having an inlet and an outlet, a closure member normally seated in said inlet and initially movable from its seat under the pressure to be released, a fluid pressure receiver externally associated with said housing, means internally of said receiver reciprocally movable therein under fluid pressure applied to the receiver, a stem connected at one end to said means extending through one wall of said housing and connected at the other end to said closure member, conduit means for supplying a fluid under pressure to said receiver to actuate said reciprocally movable means and said stem and thereby to move said closure member away from the seat to fully open the housing inlet, valve means in said conduit normally closing the conduit while venting said receiver, control means for said valve means operable alternately to pressurize and vent said receiver, a lever element and a support therefor, said element pivotally mounted on said support for reciprocally arcuate movement relative thereto in engagement with said control means at one end thereof, spring means secured to said element and acting thereon to accelerate arcuate movement of the lever element and thereby said control means, a control actuating means carried by said stem sequentially engageable with said control means and lever element to initiate operation thereof upon initial and immediately subsequent unseating movement of said closure member and stem, actuating said control means so as successively to pressurize and to vent said receiver in sequence and means for returning said closure member to its seat.

3. A device according to claim 1, in which said fluid pressure receiver is a cylinder, and said reciprocally movable means is a piston element in said cylinder.

4. A device according to claim 1, in which said fluid pressure receiver is a walled chamber and said reciprocally movable means is a flexible diaphragm element transversely of said chamber.

5. In combination with a means to accelerate movement of a valve, said valve having a stem connected to said acceleration means, a control means for energizing and de-energizing said acceleration means, comprising a manifold chamber, an inlet port opening into said chamber, an exhaust port opening from said chamber, and a discharge port in open communication with said chamber, an inlet port closure member in said chamber normally closing said inlet port, an exhaust port closure member in said chamber disposed in spaced relationship to said inlet closure member and normally spaced from the exhaust port, a common rod support for said closure members extending outwardly from said chamber through said exhaust port and disposed for reciprocal movement in said chamber, a lever element and a support therefor, said element pivotally mounted on said support for reciprocal arcuate movement relative thereto in engagement with the rod, spring means secured to said element and acting thereon to accelerate arcuate movement of the lever element and thereby reciprocal movement of said rod, and means carried by said valve stem and movable therewith sequentially engaging said rod and then the lever upon initial and immediately subsequent movement of the stem, actuating said rod, lever, and spring means, and thereby the closure members so as alternately to open and close the inlet port and alternately to close and open the exhaust port in sequence.

HAROLD M. McCARTHY.

References Cited in the file of this patent

UNITED STATES PATENTS

| Number | Name | Date |
|---|---|---|
| 1,837,007 | Wolfe | Dec. 15, 1931 |
| 2,180,395 | Briscoe | Nov. 21, 1939 |
| 2,287,936 | Hose | June 30, 1942 |
| 2,450,554 | Jorgensen | Oct. 5, 1948 |

FOREIGN PATENTS

| Number | Country | Date |
|---|---|---|
| 23,336 | Great Britain | of 1912 |